Figure 1:
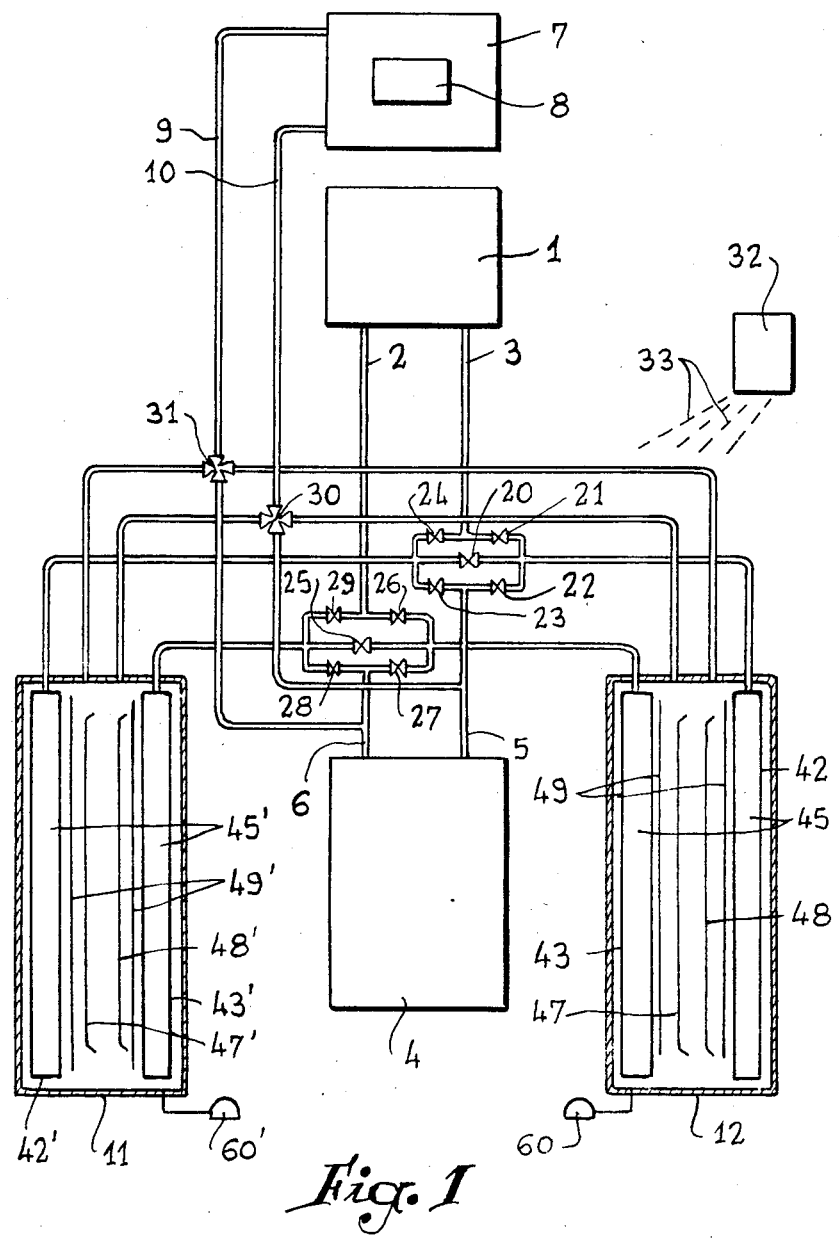

United States Patent [19]

Brandon et al.

[11] Patent Number: 4,548,046
[45] Date of Patent: Oct. 22, 1985

[54] THERMODYNAMIC APPARATUS FOR COOLING AND HEATING BY ADSORPTION ON A SOLID ADSORBENT AND PROCESS FOR USING THE SAME

[75] Inventors: Bernard Brandon, Villeurbanne; André Bailly, Decines; Francis Meunier, Igny, all of France

[73] Assignees: Centre Technique des Industries, Orsay; Centre National de la Recherche Scientifique, Paris, both of France

[21] Appl. No.: 601,605

[22] Filed: Apr. 18, 1984

[30] Foreign Application Priority Data

Apr. 22, 1983 [FR] France .................. 83 06882

[51] Int. Cl.⁴ .............................. F25B 7/00
[52] U.S. Cl. .......................... 62/79; 62/476; 62/480
[58] Field of Search ............ 62/79, 480, 275.1, 476

[56] References Cited

U.S. PATENT DOCUMENTS

| | | | |
|---|---|---|---|
| 4,121,432 | 10/1978 | Weil et al. | 62/79 |
| 4,165,952 | 8/1979 | Bennett | 62/480 X |
| 4,183,227 | 1/1980 | Bouvin et al. | 62/480 |
| 4,184,338 | 1/1980 | Bennett | 62/480 X |
| 4,199,952 | 4/1980 | Berg | 62/480 X |
| 4,205,531 | 6/1980 | Brunberg et al. | 62/480 X |
| 4,372,376 | 2/1983 | Nelson et al. | 165/104.12 |

FOREIGN PATENT DOCUMENTS

| | | |
|---|---|---|
| 0025986 | 4/1981 | European Pat. Off. . |
| 0055855 | 5/1981 | European Pat. Off. . |
| 516290 | 1/1931 | Fed. Rep. of Germany . |
| 988886 | 9/1951 | France . |
| 2342471 | 9/1977 | France . |
| 2465970 | 3/1981 | France . |

Primary Examiner—Lloyd L. King
Attorney, Agent, or Firm—Parkhurst & Oliff

[57] ABSTRACT

The invention relates to an improved thermodynamic apparatus for cooling or heating by adsorption of a refrigerating fluid on a solid adsorbent. The apparatus includes—a hot circuit adapted to heat and circulate a heating fluid;—a cold circuit adapted to cool and circulate a cooling fluid;—a cooling circuit for an enclosure to be air-conditioned;—two tanks containing a solid compound with large capacities but having a low energy of adsorption, said tanks, connected together and to the different. The two tanks comprising: at least one reactor adapted to receive said adsorbent compound, at least one condenser adapted to condense the refrigerating fluid desorbed under the effect of the action of the hot fluid passing through the adsorbent compound laden with refrigerating fluid, at least one evaporator adapted to vaporize the refrigerating fluid adsorbed on the adsorbent compound cooled by the cold circuit, such that:—the hot circuit is adapted to be connected to the reactors of the two tanks;—the cold circuit is adapted to be connected either to the condensers or to the reactors of the two tanks;—finally, the cooling circuit is adapted to be connected to the evaporators of the two tanks.

10 Claims, 7 Drawing Figures

THERMODYNAMIC APPARATUS FOR COOLING AND HEATING BY ADSORPTION ON A SOLID ADSORBENT AND PROCESS FOR USING THE SAME

The present invention relates to an apparatus for the production of heat or cold utilizing a source of heat, and by adsorption on a solid adsorbent. It relates more particularly to a novel process of refrigeration from a source of energy of which the temperature range is included between 100° and 300° C., such as in particular solar energy. It also relates to a process for implementing such an installation.

Techniques are known for producing cold from a hot source by adsorption of a refrigerating fluid on a solid adsorbent (cf. in particular U.S. Pat. Nos. 1,881,208, 2,377,589 and 3,270,512 and British Pat. No. 385,407). Briefly, such installations essentially comprise:

a hot circuit adapted to heat and circulate a heating fluid;
a cold circuit adapted to cool and circulate a cooling fluid;
a cooling or air-conditioning circuit for the enclosure to be air-conditioned;
two tanks containing a solid compound having a large capacity but a low energy of adsorption, these two tanks, connected together and to the different circuits, comprising:
at least one exchanger, called "reactor", adapted to receive said adsorbent compound and have this compound to react with the refrigerating fluid;
at least one condenser adapted to condense the refrigerating fluid evaporated under the effect of the action of the hot fluid passing through the adsorbent compound laden with refrigerating fluid,
at least one evaporator adapted to vaporize the refrigerating fluid adsorbed on the adsorbent compound cooled by the cooling fluid circuit.

In Applicants' French Patent FR-A-2 465 970, corresponding to PCT-WO 81/00904 (PCT/FR 80/00139), it was suggested, before the inversion of the adsorption-desorption cycle, i.e. when each tank is close to its point of equilibrium, to equalize the temperatures between these two tanks.

However, the above-mentioned prior art solutions, present numerous advantages, but require pipes and valves adapted to work under refrigerating fluid pressure, i.e. in depression if these fluids are water or methanol and under excess pressure for other fluids such as ammonia, which, during the cycle, generates considerable pressure drops likely to bring about a drop in temperature which is generally estimated at around 10° C. for water. Furthermore, as the different valves connecting the pipes and the circuits together must be capable of working under this refrigerating fluid pressure, this creates leakages, and, substantially increases the total cost of these installations.

It is an object of the present invention to overcome these drawbacks and to this end an installation of the present invention includes two adsorbent tanks, which do not require special pipes or valves to work under refrigerating fluid pressure and is consequently more economical both to construct and operate. In addition, this installation presents an improved COP (coefficient of performance).

This improved cooling apparatus by adsorption of a refrigerating fluid on solid adsorbent, of the present invention comprises:

a hot circuit adapted to heat and circulate a heating fluid;
a cold circuit adapted to cool and circulate a cooling fluid;
a cooling or air-conditioning circuit for the enclosure to be air-conditioned;
two tanks containing a solid compound having a large capacity but with a low energy of adsorption, said tanks, connected together and to the different circuits, comprising:
at least one reactor adapted to receive said adsorbent compounds,
at least one condenser adapted to condense the refrigerating fluid desorbed under the effect of the action of the hot fluid passing through the adsorbent compound laden with refrigerating fluid,
at least one evaporator adapted to vaporize the refrigerating fluid adsorbed on the adsorbent compound cooled by the cold circuit.

This installation is characterized in that:
the hot circuit is adapted to be connected to the reactors;
the cold circuit is adapted to be connected either to the condensers or to the reactors of the two tanks;
finally, the cooling circuit is adapted to be connected to the evaporators of the two tanks.

Preferably:
the tanks are composed of a horizontal, cylindrical, one-piece tank proper, under refrigerating fluid pressure, which comprises:
the reactor itself constituted by a plurality of parallel finned tubes, the space between the tubes being at least partially filled with adsorbent compound, said tubes being placed to form a circle,
at the centre, a member forming both evaporator and condenser, namely the "evaporator-condenser", constituted either by a plurality of superposed plates parallel to one another and parallel to the tubes, or by a trickling exchanger,
an anti-radiation screen disposed between the evaporator-condenser and the finned tubes,
toric manifolds connecting the tubes and the evaporator-condenser to the different inlets and outlets of the different circuits.
the source of heat of the hot circuit is constituted by a solar collector or by a boiler;
the source of cold of the cold circuit is constituted by an air coolant or by a cooling tower, connected to the ambient air or by an available cooling fluid circuit;
the cooling circuit comprises either an air-water battery or any other heat exchanger, which also is capable of producing ice;
the three circuits and the two tanks are connected together by conventional pipes and valves under water or thermal oil pressure;
the solid absorbent is selected from the group including zeolites, activated charcoals, gels of silica and activated alumina; the refrigerating fluid is selected from the group including water, methanol and ammonia.

The invention also relates to a process for implementing such an apparatus.

This process comprises the following steps:
a first stage of, simultaneously, connecting:

the hot circuit to the reactor of the first tank to provide desorption of the heating fluid thereof, the cold circuit to the reactor of the second tank to allow adsorption of the refrigerating fluid thereon, and simultaneously, remaining the heat furnished by the condensation of the refrigerating fluid on the evaporator-condenser of the first tank by the cold circuit and taking from the cooling circuit the energy of vaporization of the refrigerating fluid on the evaporator-condenser of the second tank;

a second stage, after having connected together the reactors of the two tanks so that a thermal equilibrium between these reactors can be reached, cooling of the first tank which begins to adsorb allows pre-heating of the second tank which begins to desorb, remaining the head furnished by the condensation of the refrigerating fluid on the evaporator-condenser of the second tank on the cold circuit and taking from the cooling circuit the energy of vaporization of the refrigerating fluid on the evaporator-condenser of the first tank;

a third stage, while continuing to remove the heat furnished by the condensation of the refrigerating fluid on the evaporator-condenser of the second tank on the cold circuit and to take from the cooling circuit the energy of vaporization of the refrigerating fluid on the evaporator-condenser of the first tank, connecting:

the hot circuit to the reactor of the second tank for desorption of the latter, the cold circuit to the reactor of the first tank for adsorption of the latter;

a fourth stage, after having connected the reactors of the two tanks with a view of effecting thermal equilibrium between these two reactors again, for the cooling of the second tank which begins to adsorb to allow pre-heating of the first tank which begins to desorb, removing the heat furnished by the condensation of refrigerating fluid on the evaporator-condenser of the first tank by the cold circuit and taking from the cooling circuit the energy of vaporization of the refrigerating fluid on the evaporator-condenser of the second tank;

and finally, a fifth stage, connecting:

the hot circuit on the reactor of the first tank, the cold circuit to the reactor of the second tank, and continuing to remove the heat generated by the condensation of the refrigerating fluid on the evaporator-condenser of the first tank by the cold circuit and continuing to draw from the cooling circuit the energy of vaporization of the refrigerating fluid on the evaporator-condenser of the second tank.

The different connections are controlled by a regulating member which controls the opening and closure of the different valves placed in the pipes of the different circuits.

Although the following embodiment refers to a cooling installation, the invention may also be adapted for the production of heat, without departing from the scope the present invention.

The invention will be more readily understood on reading the following description with reference to the accompanying drawings, in which:

FIG. 1 schematically shows an installation according to the invention.

Figure 2:
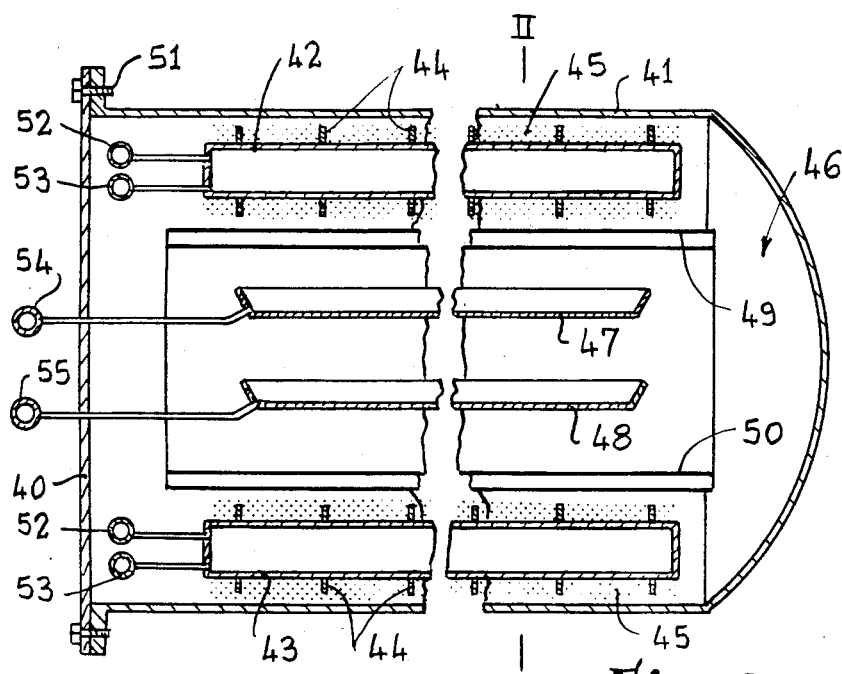
Figure 3:
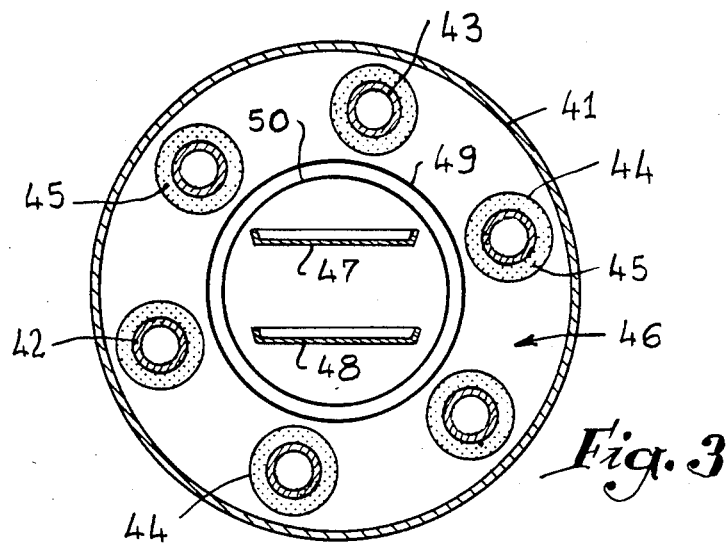
Figure 4:
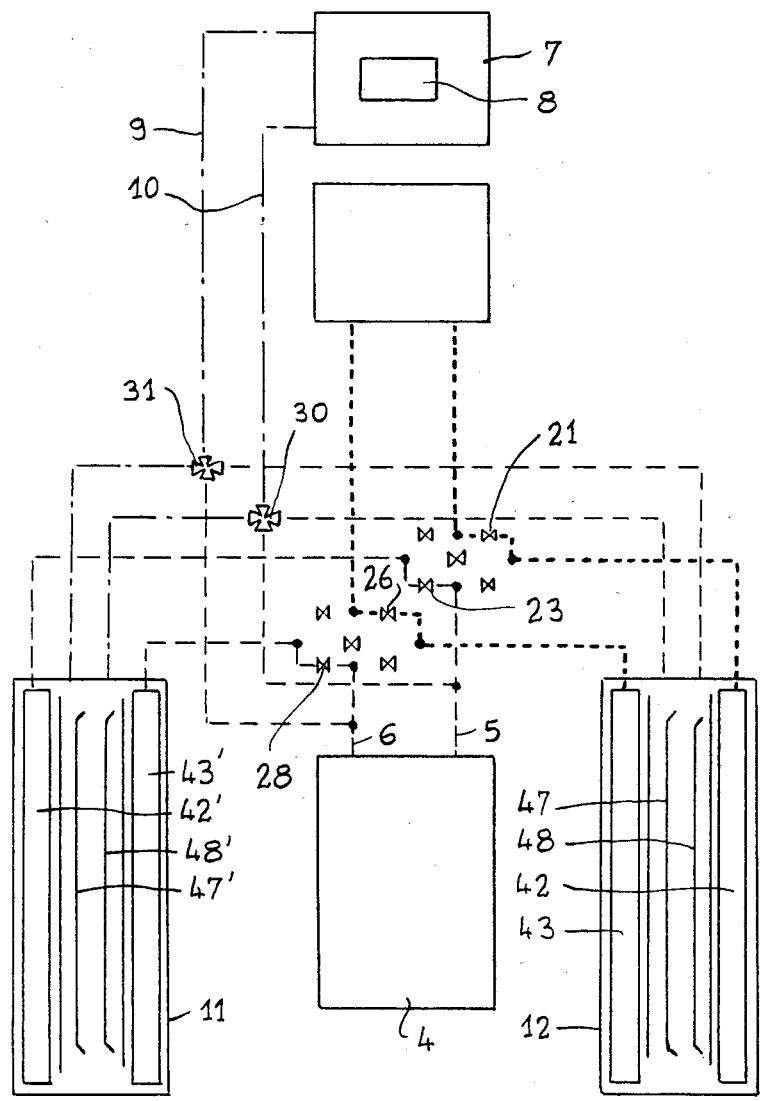
Figure 5:
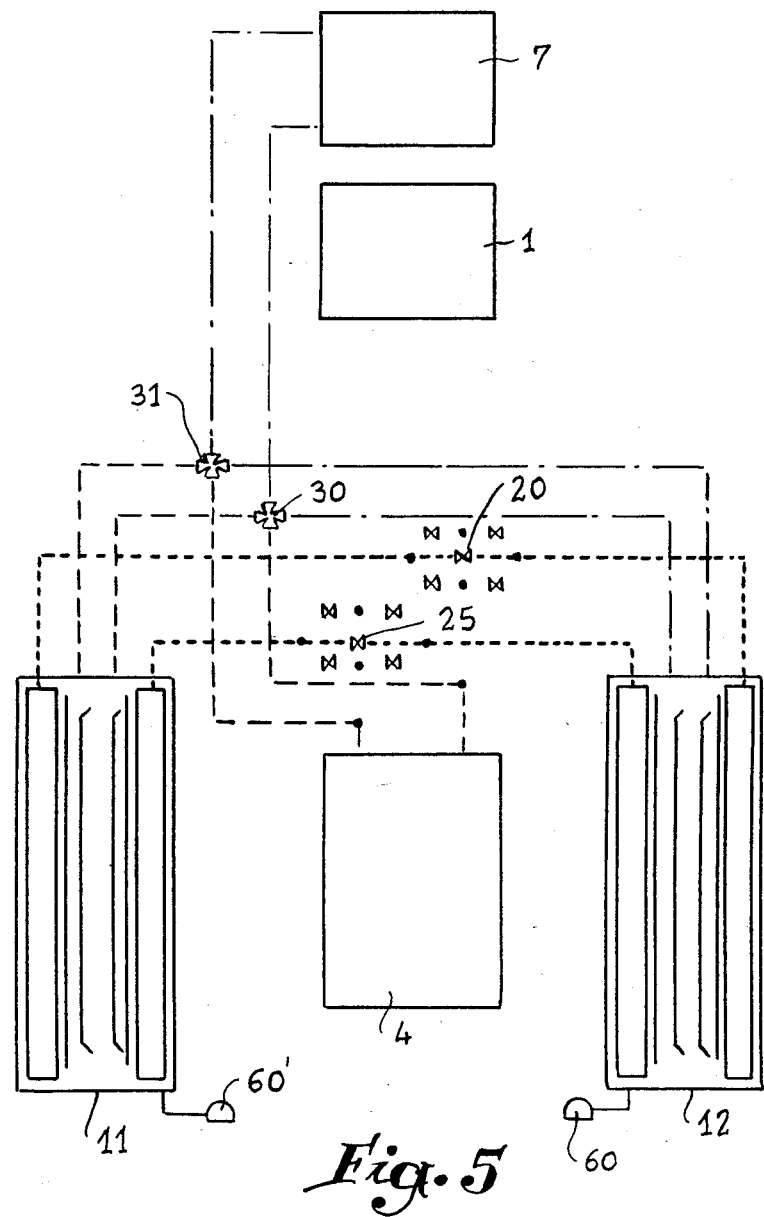
Figure 6:
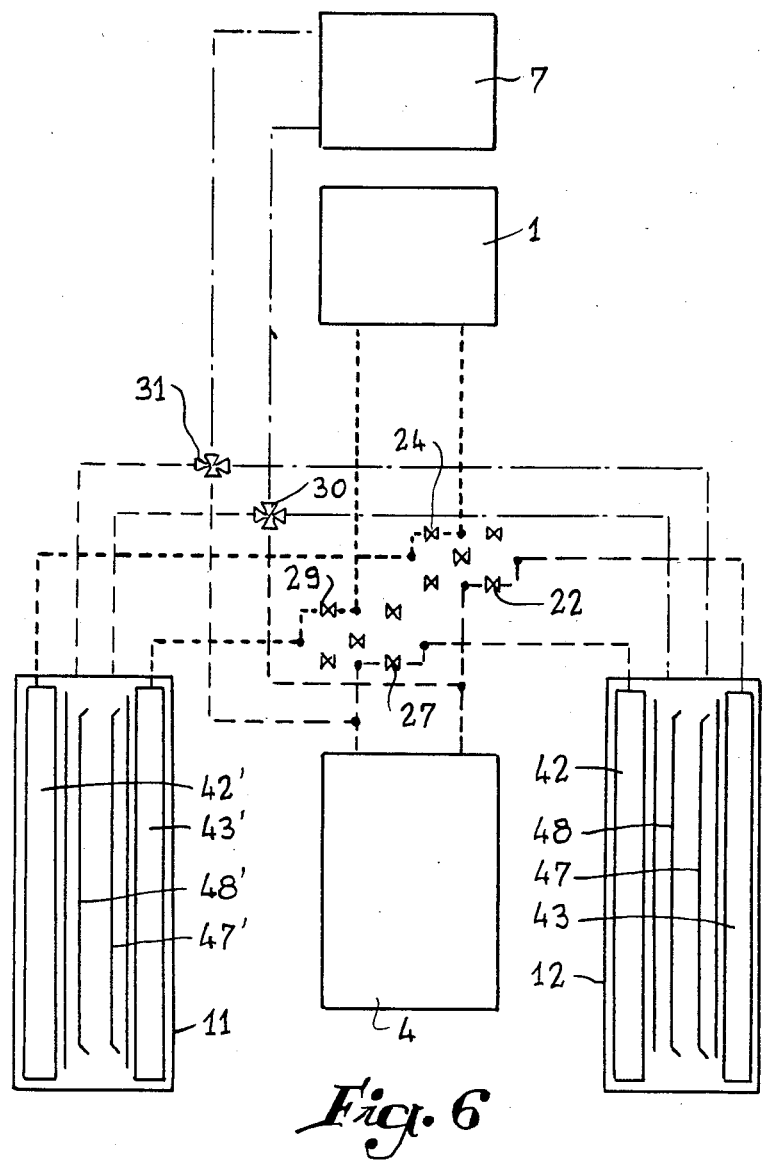
Figure 7:
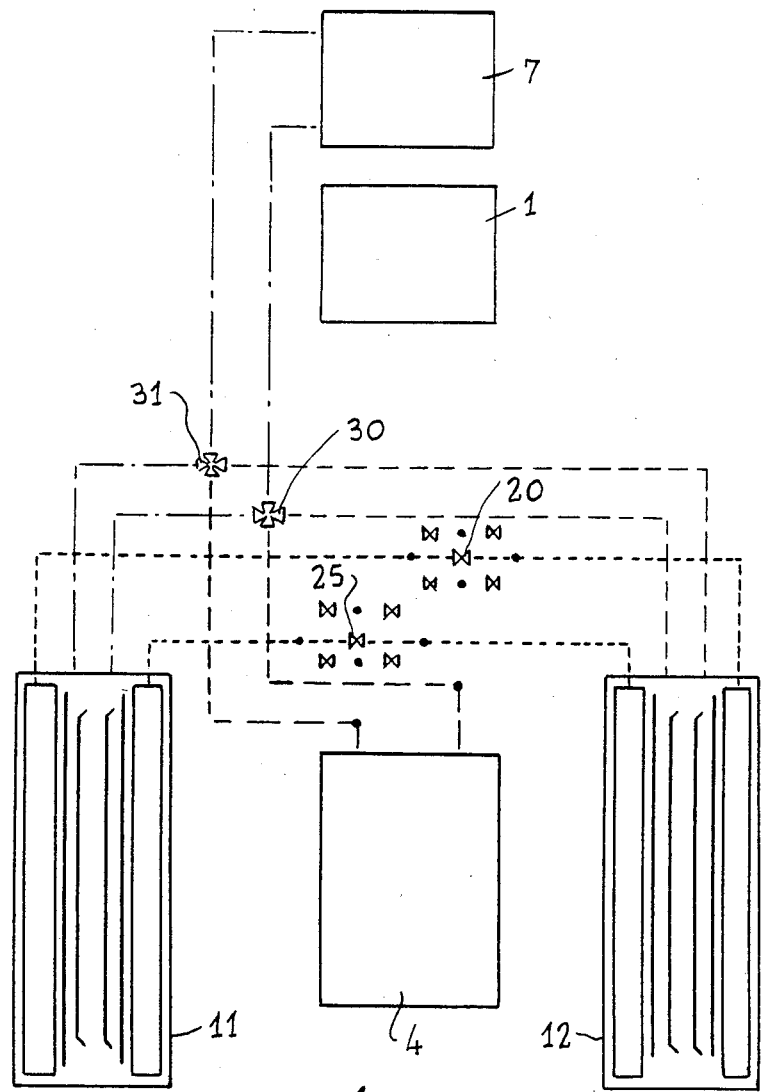

FIGS. 2 and 3 respectively show, in section and in cross section along axis II—II, the one-piece tank characteristic of the invention.

FIGS. 4 to 7 schematically illustrate the principal phases of operation of the process.

Referring now to the drawings, the installation for cooling by adsorption on solid adsorbent (cf. FIG. 1) comprises:

a source of heat 1 such as a solar collector or a boiler, to heat and circulate a heating fluid, such as water or oil, through conventional outlet pipe 2 and return pipe 3. The assembly 1, 2, 3 thus forms the hot circuit;

a cold source 4 for example, a cooling tower or an air-coolant, connected to the ambient air, intended to cool and circulate a cooling fluid, such as water, through conventional outlet pipe 5 and return pipe 6. The assembly 4, 5, 6 forms the cold circuit;

a cooling circuit 7, for example to air-condition, placed in the enclosure (not shown) to be air-conditioned, such as premises or a cold room or even an ice-making chamber, with its air-water battery 8 and its conventional outlet (9) and return (10) connecting pipes. The assembly 7, 9, 10 forms the air-conditioning circuit; all the pipes 2, 3, 5, 6, 9, 10 are conventional pipes under water pressure or under pressure of other appropriate fluids: thermal oils;

two one-piece tanks, namely, a first tank 11 and a second tank 12 as shown in detail in FIGS. 2 and 3; the one-piece tanks 11, 12 being essentially constituted by:

a bottom 40 on which open out the different outlet and return pipes mentioned hereinabove, a horizontal tank 41 substantially cylindrical in form, for examples made of stainless steel, connected to the bottom 40 by flanges 51, a plurality, for example six, of tubes 42, 43 provided with parallel radial fins 44 filled with a solid adsorbent compound 45 having a high capacity of adsorption and a low energy of adsorption, such as for example a zeolite of type 13 X; these tubes 42, 43 form the reactor and are placed to form a circle on the inner periphery of the tank 41, and filled with water vapour 46 in vacuo, the space defined by outer cylindrical screen 49 and the horizontal tank 41 two plates 47, 48 parallel to each other and also parallel to the tubes 42, 43 form an evaporator-condenser; as has already been said, these plates 47, 48 may be replaced by a trickling exchanger such as a bundle of finned tubes over which the refrigerating fluid trickles in closed circuit in the tank;

two cylindrical screens 49, 50 coaxial to the tank 41 and which enclose the plates 47, 48 therein; these two anti-radiation screens 49, 50 may for example be made of polished aluminium sheet, and used to inhibit heat exchange between the plates 47, 48 and the reactor tubes 42, 43, a first toric manifold 52 connecting the different inlets of the reactors 42, 43, and a second likewise toric manifold 53 connecting the outlets of this same reactor 42, 43, two straight manifolds 54, 55 outside the tank 41 connecting the plates 47, 48 to the different inlets or outlets of the different circuits;

a plurality of valves 20 to 31 placed in the pipes 2, 3, 5, 6, 9, 10 are essentially of two types:

either conventional simple valves 20 to 29, i.e. two-way valves, adapted to work under water or other fluid pressure, or conventional multiple valves 30, 31 (four-way);

a conventional regulating member 32 connected by connections 33 to the different valves 20 to 31, in order to control the opening and closure of these valves.

In these Figures, reference dash (') symbolizes the second tank 11.

The installation operates as follows:

FIRST PHASE

Desorption in 12, adsorption in 11 (FIG. 4):

At the start, the hot source 1 is connected by pipes 2, 3 (circuit in dotted lines) on tubes 42, 43 of the first tank 12. The heating fluid flowing from the source 1 is sent to tubes 42, 43 of the reactor.

The zeolite contained between fins 44 is thus desorbed. Consequently, the water of the zeolite condenses on plates 47, 48 of the first tank 12.

The heat recovered on these plates is then removed to the cold source 4 by the circuit shown in dashed lines, due to the interchange of the valves 30, 31. Simultaneously, the cold source 4 is connected by the circuit in dashed lines to the reactors 42' of the second tank 11. In this way, the zeolite contained on these tubes 42' adsorbs water vapour coming from the evaporator-condenser plates 47', 48' of this second tank 11. The necessary vaporization heat is then taken from the air-conditioning circuit 7 by the pipes 9, 10 and by the valves 30, 31 (circuit shown in dashed and dotted lines), in order to cool the water battery 8 of this air-conditioning circuit 7.

During the whole of this first phase, the valves 21, 23, 26, 28 are open, whilst valves 20, 22, 24, 25, 27, 29 are closed.

The four-way valves 30, 31 thus act in both directions.

SECOND PHASE

Internal exchange (FIG. 5):

When for example, with the aid of a pressure sensor 60 or temperature sensor, the end of adsorption or of desorption in the two tanks 11, 12 is detected, it is sought to recover the internal heat of these two tanks 11, 12.

To this end, by applying the teaching of Applicant's French Patent Application FR-A-2 465 970, the reactors 42, 43, 42', 43' with zeolite of the two tanks 11, 12 (circuits shown in dotted lines) are connected together thanks to valves 20, 25. In this way, the water circulates between the two tanks 11, 12 so that the cooling of the first tank 12 which begins to adsorb allows pre-heating of the second tank 11 which begins to desorb. This improves yield.

Simultaneously, the valves 30 and 31 and opened so as to ensure:

on the one hand, the connection between the air-conditioning circuit 7 and the evaporator-condenser 47, 48 of the first tank 12 (circuit in dashed and dotted lines);

on the other hand, the connection between the cold circuit 4 and the evaporator-condenser 47', 48' of the second tank 11 (circuit in dashed lines).

When thermal equilibrium between the two reactors has been attained, the exchange between these two reactors is stopped by closing valves 20 and 25.

THIRD PHASE

Desorption of 11-adsorption on 12 (FIG. 6):

Here, the hot source 1 is switched on the reactor 42', 43' of the second tank 11 by opening the valves 24 and 29 (circuit in dotted lines). By a process similar to phase I but in the reverse direction, desorption continues on the evaporator-condenser 47', 48' contained in this second tank 11 and the heat furnished by the evaporator-condenser of this tank 11 continues to be removed towards the cold course 4 (circuit in dashed lines) by opening valves 30 and 31.

Simultaneously, by opening valves 22 and 27, the cold source 4 is switched on the reactors 42, 43 of the first tank 12 (circuit in dashed lines) which continues to adsorb in this way water vapour coming from the evaporator-condenser of this tank 12. The heat continues to be taken from the plates 47, 48 of the first tank 12 towards the air-conditioning circuit 7 thanks to valves 30 and 31 (circuit in dashed and dotted lines).

The end of this third phase is detected, as previously.

During this phase, only valves 22, 24, 27, 29 are open, the four-way valves 30 and 31 acting in both directions.

FOURTH PHASE

Internal exchange (FIG. 7):

As in phase two, the internal exchange between the two tanks 11 and 12 is effected. In this way the second tank 11 is cooled and begins to adsorb, while the first tank 12 is preheated and begins to desorb.

Simultaneously, valves 30 and 31 are open so as to ensure:

on the one hand, the connection between the air-conditioning circuit 7 and the evaporator-condenser 47', 48' of the second tank 11 (circuit in dashed and dotted lines);

on the other hand, the connection between the cold circuit 4 and the evaporator-condenser 47', 48' of the first tank 12 (circuit in dashed lines).

FIFTH PHASE

Desorption in 12-adsorption in 11 (FIG. 4):

When thermal equilibrium between the reactors of the two tanks 11 and 12 is attained, the hot circuit 1 is switched on the reactor 42, 43 of the first tank 12;

the cold circuit 4 is switched on the reactor 42', 43' of the second tank 11;

and the heat furnished by the condensation of the water on the evaporator-condenser 47, 48 of the first tank 12 continues to be evacuated by the cold circuit 4 and the energy of vaporization of the refrigerating fluid on the evaporator-condenser 47', 48' of the second tank 11 continues to be taken from the air-conditioning circuit.

In brief, this virtually reproduces phase one, at least at the level of the circuits.

The cycle then recommences.

During all these phases (FIGS. 4 to 7), the movements of opening and of closing of the different valves are ensured by a conventional regulating member 32 connected by connections 33 to each valve in question.

In fact, this regulator 32 controls essentially three groups of valves, namely valves 20 and 25 in opposition with all the other two-way valves, namely 21, 22, 23, 24, 26, 27, 28, 29;

valves 21, 23, 26, 28 in opposition with valves 22, 24, 27, 29;

the four-way valves 30, 31 controlled by 32.

In FIGS. 4 to 7, the circuits in dotted lines represent the phases of desorption and the phases of recovery of the heat, whilst the circuits in dashed lines represent the phases of adsorption and of condensation and finally the circuits shown in dashed and dotted lines illustrate the phases of evaporation.

The installation according to the invention presents numerous advantages over what was known heretofore. For example:

the semi-continuous production of cold;

the absence of mobile elements in the sensitive parts, i.e. in the tanks 11, 12;

the fact that it is not necessary to use special pipes or valves, particularly valves or pipes capable of working under refrigerating fluid pressure; consequently, conventional pipes or valves may be used, simplifying the problems of tightness;

the phases of equilibrium two and four enable improved COPs to be obtained;

the possibility of using hermetic tanks due to the one-piece structure.

Consequently, these installations may be successfully used:

the air-conditioning premises from a hot source, such as for example a solar collector;

for preserving food in hot countries;

as heat pump (production of heat), by using the energy furnished in adsorption and in condensation: by recovering all the energy furnished to the cold source, premises may thus be heated, particularly by taking from the ambient air the energy of vaporization;

in addition, by replacing the zeolite by activated charcoal as adsorbent body and the water of the circuit by methanol, the production of ice or conservation at low temperature may even be envisaged.

Although the installation more advantageously comprises two tanks, it may, however, be interesting, for certain applications, particularly when the hot source is at high temperature (for example of the order of 250° C.), to use three tanks connected together in accordance with the teaching of the invention.

What is claimed is:

1. An improved thermodynamic apparatus employing adsorption of a refrigerating fluid on a solid adsorbent, for cooling or heating, comprising:

two interconnected tanks containing a solid compound having a large capacity but a low energy of adsorption, each tank having:
  (i) at least one reactor for receiving said adsorbent compound;
  (ii) at least one condensor for condensing refrigerating fluid desorbed by the action of a hot fluid passing through adsorbent compound laden with refrigerating fluid;
  (iii) at least one evaporator for vaporizing refrigerating fluid adsorbed on the adsorbent compound cooled by a cold circuit;

a hot circuit connectible to the at least one reactor of each of the two tanks for heating and circulating said hot fluid;

an air-conditioning circuit connectible to the at least one evaporator of each of the two tanks for cooling an enclosure to be air-conditioned; wherein said cold circuit is alternately connectible to the at least one condensor and the at least one reactor of the two tanks; and wherein each tank comprises a one-piece tank, under refrigerating fluid pressure, having:

a plurality of parallel finned tubes covered with adsorbent compounds, forming reactors;

superposed plates parallel to one another and parallel to the tubes at the center of said tank and comprising both said evaporator and said condensor;

at least one anti-radiation screen disposed between the evaporator-condensor and the reactor tubes;

manifolds connecting the reactor tubes and the evaporator-condenser to the inlets and outlets of said circuits.

2. An improved thermodynamic apparatus employing adsorption of a refrigerating fluid on a solid adsorbent, for cooling or heating, comprising:

two interconnected tanks containing a solid compound having a large capacity but a low energy of adsorption, each tank having:
  (i) at least one reactor for receiving said adsorbent compound;
  (ii) at least one condensor for condensing refrigerating fluid desorbed by the action of a hot fluid passing through adsorbent compound laden with refrigerating fluid;
  (iii) at least one evaporator for vaporizing refrigerating fluid adsorbed on the adsorbent compound cooled by a cold circuit;

a hot circuit connectible to the at least one reactor of each of the two tanks for heating and circulating said hot fluid;

an air-conditioning circuit connectible to the at least one evaporator of each of the two tanks for cooling an enclosure to be air-conditioned; wherein said cold circuit is alternately connectible to the at least one condensor and the at least one reactor of the two tanks; and wherein each tank comprises a one-piece tank, under refrigerating fluid pressure, having:

a plurality of parallel finned tubes covered with adsorbent compounds, forming reactors;

a trickling exchanger at the center of said tank, said exchanger comprising both said evaporator and said condensors;

at least one anti-radiation screen disposed between the evaporator-condensor and the reactor tubes;

manifolds connecting the reactor tubes and the evaporator-condenser to the inlets and outlets of said circuits.

3. The apparatus of claim 1 or 2, wherein the hot circuit has a heat source selected from the group consisting of a solar collector and a boiler.

4. The apparatus of claim 2, wherein the cold circuit has a cold source selected from the group consisting of an air coolant, a cooling tower connected to the ambient air, and an available cooling fluid.

5. The apparatus of claim 2, wherein the air-conditioning circuit comprises a circuit selected from the group consisting of an air-water battery and a heat exchanger producing ice.

6. The apparatus of one of claims 1 or 2, wherein said circuits and the two tanks are connected together by conventional pipes and valves under water or thermal oil pressure.

7. The apparatus of claim 1, wherein the solid adsorbent is selected from the group including zeolites, activated charcoals, gels of silica and activated alumina, and the refrigerating fluid is selected from the group including water, methanol and ammonia.

8. A process for operating the thermodynamic apparatus of one of claims 1 or 2, comprising the following steps:

in a first stage, simultaneously connecting:
- the hot circuit to the exchanger to start desorption of the heating fluid thereof,
- the cold circuit to the reactor of the second tank to allow adsorption of the refrigerating fluid thereon,
- and simultaneously, removing the heat furnished by the condensation of the refrigerating fluid on the condensor of the first tank by the cold circuit and removing from the cooling circuit the energy of vaporization of the refrigerating fluid on the evaporator of the second tank;

in a second stage, connecting together the reactors of the two tanks to thermally equilibrate these reactors, for cooling the first tank, which then begins to adsorb, and to allow pre-heating of the second tank, which then begins to desorb, while continuing to remove the heat furnished by the condensation of the refrigerating fluid on the condensor of the second tank on the cold circuit and continuing to remove from the cooling circuit the energy of vaporization of the refrigerating fluid on the evaporator of the first tank;

in a third stage, while continuing to remove the heat furnished by the condensation of the refrigerating fluid on the condensor of the second tank on the cold circuit and to take from the cooling circuit the energy of vaporization of the refrigerating fluid on the evaporator of the first tank, connecting:

the hot circuit to the reactor of the second tank for desorption of the latter,
the cold circuit to the reactor of the first tank for adsorption of the latter;

in a fourth stage, connecting the reactors of the two tanks again to thermally equilibrate these two reactors again, for the cooling of the second tank, which then begins to adsorb, and to allow pre-heating of the first tank, which then begins to desorb, while continuing to remove the heat generated by the condensation of the refrigerating fluid on the condensor of the first tank by the cold circuit and continuing to remove from the cooling circuit the energy of vaporization of the refrigerating fluid on the evaporator of the first tank by the cold circuit and continuing to remove from the air-conditioning circuit the energy of vaporization of the refrigerating fluid on the evaporator of the second tank;

and finally, in a fifth stage, connecting:
the hot circuit to the reactor of the first tank,
the cold circuit to the reactor of the second tank,
and continuing to remove the heat generated by the condensation of the refrigerating fluid on the condensor of the first tank by the cold circuit and continuing to remove from the cooling circuit the energy of vaporization of the refrigerating fluid on the evaporator of the second tank.

9. The process of claim 8, wherein the different connections are regulated by a regulating member which controls opening and closing of valves placed in pipes of the different circuits.

10. The apparatus of claims 1 orr 2, wherein each one-piece tank is horizontal and cylindrical, and the finned tubes thereof are disposed around a circle inside the periphery of the tank.

* * * * *